Figure 1:
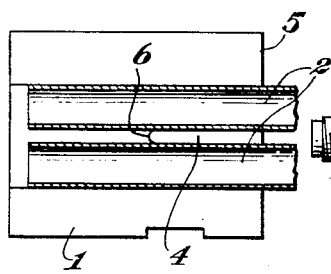

Aug. 29, 1933.   C. H. TRUE   1,924,891

METHOD OF MAKING PIPE STRUCTURES

Filed April 18, 1930

Charles H. True
INVENTOR

BY O. V. Thiele
ATTORNEY

Patented Aug. 29, 1933

1,924,891

UNITED STATES PATENT OFFICE 1,924,891

METHOD OF MAKING PIPE STRUCTURES

Charles H. True, Chicago, Ill., assignor to The Superheater Company, New York, N. Y.

Application April 18, 1930. Serial No. 445,286

5 Claims. (Cl. 29—157.6)

This invention relates to return bends and other similar structures made by a process and apparatus shown for example in the following U. S. Patents: #1,169,209, 1,115,109 and 1,264,455.

The common idea underlying these patents is that of joining of two or more parallel pipes into a unitary structure. The widest application the idea has is in the manufacture of return bends, these bends being made out of the material of the pipes themselves without the addition of any separate piece. The idea, however, is not limited to the manufacture of return bends, but may be applied to the manufacture of Y's, that is, structures in which two pipes are connected to and open into a third pipe. As illustrated in the Patent 1,264,455, more than two pipes may be connected to each other.

The general procedure for producing these structures is to split each of the pipes to be joined for a suitable distance inward from its end, to bend the portions adjacent to the split outward and then to weld the edges of the bent-out portions of one pipe to those of the other. All of this, of course, is done while the pipes are heated to a suitable temperature.

The whole process is performed in a die enclosing the two pipe ends and holding them in their proper relation, the splitting and spreading being done by a male die. The process will be described a little more in detail in connection with the drawing. The purpose of the present invention is to modify the structure resulting from the process just briefly outlined in such a way that the two pipes lie closer together than is possible in producing the structure by the process as hitherto practiced.

Figure 2:
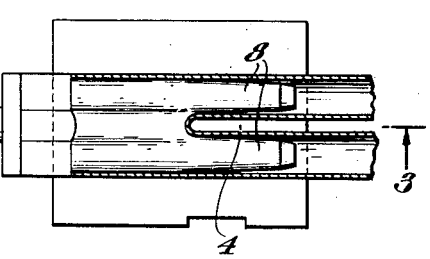
Figure 3:
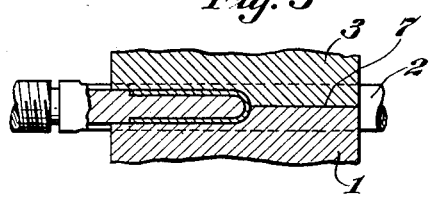
Figure 4:
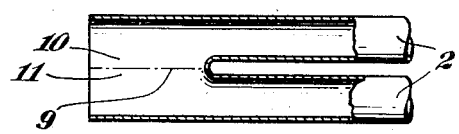
Figure 5:
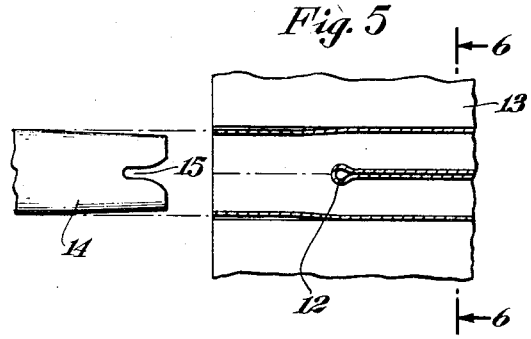
Figure 6:
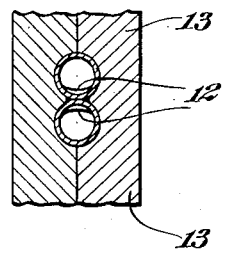
Figure 7:
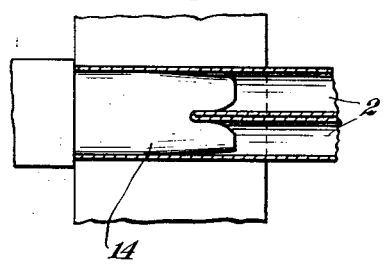
Figure 8:
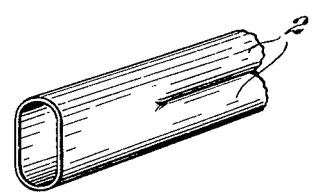
Figure 9:
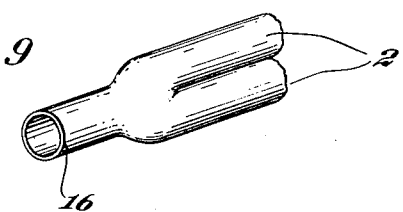

Referring to the drawing, Fig. 1 shows the lower half of the female die with the two pipe ends in section in position ready for the operation. Fig. 2 shows the pipe ends in the same position with the male die at the end of its inward stroke. Fig. 3 shows a section on line 3—3 of Fig. 2, portions of both halves of the female die being shown; Fig. 4 shows the structure as it looks after this first part of the process is finished, this figure being partly in section and partly in elevation. Fig. 5 illustrates an apparatus and process for performing one of the steps involved in my present invention; Fig. 6 shows a section on line 6—6 of Fig. 5; Fig. 7 is similar to Fig. 6, the male die having performed its stroke; Fig. 8 shows the structure after the process carried out by the apparatus of Figs. 5, 6 and 7 is completed, and Fig. 9 shows the structure after a further step has been performed on it.

Reference will first be made to Figs. 1, 2 and 3 which illustrate the known process, and Fig. 4 which illustrates the product of this process. There is shown in Fig. 1 the lower half 1 of the female die. This die has two semi-cylindrical grooves in which the pipes 2—2 are placed. The upper half of the die is symmetrical with the lower half and appears at 3 in Fig. 3. Between the two of them they form two grooves into which the two pipes 2—2 are placed as shown. The two grooves spoken of above in which the pipes 2—2 lie are separated by a partition 4 in each die-half. This partition is seen in the half die 1, extending from the end 5 to a point 6 intermediate the two ends of the die. The two partitions 4 meet along the line 7, Fig. 3. From the point 6 to the opposite end of the die, the partition 4 is omitted so that there is an open space between the two pipes 2—2.

In Fig. 2 the male die is shown at the end of its inward stroke. It will be understood that this stroke is given to the die by suitable mechanism. The two prongs 8—8 of the die enter the pipes 2—2 as the die makes its inward stroke, and the pipes 2—2 are each split along a line extending inward from the ends of the pipes. The portions adjacent to the split are at the same time automatically turned outward against the wall of the female die and the edges of the portions of one come into forcible contact with the edges of the bent-out portions of the other. This results in a weld of the edges to each other. The resulting structure appears as shown in Fig. 4 where the dotted line 9 indicates the line of weld, and the reference numerals 10 and 11 indicate the parts which were bent toward each other and welded together at their edges.

This process and apparatus are not novel, but are well known to those skilled in this art. As is also well known, the success of the operation depends to a considerable extent on placing the pipes 2—2 the proper distance apart, or in other words, having the separating piece 4 of the right thickness. This distance by which the pipes must be separated depends on their size and must in all cases be such that the edges of the bent-out portions come into contact with each other with the requisite force. If the pipes are spaced too far apart, a poor weld or none at all will result, and if they are placed too near together there will be an excess of material and the male die cannot perform its stroke properly, but will bind. If the distance is made very much too small, the process cannot be carried out at all.

In some relations the resulting space between the two pipes is objectionable. In Fig. 4 the space is such as will result in the average case. For the use of such structures in water walls or where they are to form a tight baffle, this space is too large.

Heretofore when it was required that the two pipes be substantially in contact, this has been accomplished by forcing the two pipes together by lateral pressure in order to close up the space between them. This results in a flattening of the pipes which is quite objectionable. My process, starting with the structure of Fig. 4, likewise presses the two pipes together but proceeds to undo the undesirable features produced by such pressing. In Fig. 5 the two pipes are shown after they have been pressed together as stated. In addition to the flattening which is likely to result, there are portions of the walls, indicated by the reference numeral 12, which do not come in contact but extend into the two pipes thereby restricting the free area. This has been one of objections to the process as carried out heretofore. I correct this by placing the compressed structure into a die made up of the two halves 13—13 and then inserting the male die 14 until it assumes the position indicated in Fig. 7. The structure of this tool can readily be gathered from Figs. 5 and 7. It is essentially a bifurcated die with two cylindrical prongs whose axes coincide with the axes of the two pipes in their compressed position. The space 15 between the two prongs is just equal at its narrowest point to the thickness of the two pipe walls. After the die 14 has performed its stroke, the two pipe walls are in complete contact to the very end of the crotch.

The resulting structure is illustrated in a projected view in Fig. 8. To be of any practical value this structure must, as a general thing, be further drawn down to a complete closure in case it is meant for use as a return bend or to cylindrical connecting pieces 16, as illustrated in Fig. 9.

To use such a piece for a water wall in a furnace, for example, the opposite end of the two pipes would be similarly treated, and a resulting unit can then be used to form a completely closed wall. Other applications for this type of structure will readily suggest themselves.

It is obvious that the same inventive idea can be applied to structures such as result from the method disclosed in Patent 1,264,455 where three or more pipes are secured side by side into a unitary structure.

I claim:

1. In the process of forming a bifurcated tubular structure comprising the steps of uniting two tubes by slitting the wall of each for a distance from the end, bending outward the portions adjacent to the slits, and welding the edges of said portions together, whereby said tubes are joined into a breeches-like unitary piece with the two pipes in spaced parallel relation; the improvement which consists in forcing said two pipes into contact by lateral pressure and thereafter restoring the pipes to their circular shape and removing any deformation caused by said lateral pressure.

2. The improvement in accordance with claim 1, the step of restoring the pipes to their circular shape and removing any deformation being performed by inserting into the joined open end a bifurcated male die the two legs of which are cylindrical and on the same centers as the pipes in the final structure.

3. The improvement in accordance with claim 1, the step of restoring the pipes to their circular shape and removing any deformation being performed by placing the structure in a female die and inserting into the joined open end a bifurcated male die the two legs of which are cylindrical and on the same centers as the pipes in the completed structure, the open end being further thereafter drawn down to circular shape.

4. The process of forming a bifurcated tubular structure with the two tubes substantially tangent, comprising forming a bifurcated tubular structure with the pipes spaced, forcing them into tangent position by lateral external pressure, removing deformations caused by said lateral pressure by applying internal pressure, and by internal pressure bringing into tangent relation such parts of the pipe walls as were not brought into such relation by the external pressure.

5. The process of forming a structure having a plurality of pipes in parallel tangent relation with their interiors in open communication laterally for a distance from their ends, comprising forming a tubular structure of this type with the pipes spaced, forcing the pipes into tangent position by lateral external pressure, removing deformations caused by said lateral pressure by applying internal pressure, and by internal pressure bringing into tangent position such parts of the pipe walls as were not brought into such position by the external pressure.

CHARLES H. TRUE.